UNITED STATES PATENT OFFICE.

WILLIAM SEWARD, OF TORONTO, ONTARIO, CANADA.

MANUFACTURE OF SHEET-RUBBER.

1,274,091.                    Specification of Letters Patent.      Patented July 30, 1918.

No Drawing.          Application filed February 27, 1918.   Serial No. 219,395.

*To all whom it may concern:*

Be it known that I, WILLIAM SEWARD, a citizen of the United States of America, residing in the city of Toronto, county of York, Province of Ontario, Canada, have invented certain new and useful Improvements in the Manufacture of Sheet-Rubber, of which the following is a specification.

The object of my invention is to produce in a simple and economical manner sheet rubber possessing certain desirable characteristics as hereinafter described. As the result of the washing and drying processes to which crude rubber is subjected either at the plantation or after receipt by the manufacturer it assumes the form of clean dry sheets, irregular and rough in surface, of varying width and length, and full of holes of varying size and number. This rubber possesses no "grain" and its rough appearance has caused it to be commonly referred to as "crape" rubber. The term "crape" rubber therefore when used in this specification refers to such washed and dried pure rubber as I have described, whether in the very thin sheets to which the term is commonly applied or in the coarser thicker sheets which possess the "crape" characteristics, as it were, in magnified form.

The next step usually taken in the manufacture of the rubber is to take this clean and dry rubber and pass it through suitable rolls to mass it or break it up until it becomes plastic to a suitable degree. This broken down rubber, when desired in sheet form, is either sent directly to the sheeting calenders and rolled to form sheets of any desired thickness and thereafter cured by the well known acid process or by subjecting it to an action which can be described as the "migration of sulfur," or else the rubber, before sheeting, is suitably colored or mixed with suitable fillers, or has vulcanizing agents incorporated therein ready for vulcanization in the usual way by the application of heat.

Whether the rubber be sheeted in its pure form or mixed with other ingredients, it will possess what is commonly called a grain, that is, the plastic mass of practically inert rubber is compressed, heated and sheeted out in such a way that the fibers are elongated in one direction, which is at right angles to the axis of the rolls. The result is that the stretch is taken out of the roll of sheeted rubber longitudinally and to but a limited extent transversely. When a piece of such sheeted rubber is cut and allowed to rest, unequal shrinkage occurs, which must be allowed for and discounted in the manufacture of any object made from sheeted rubber. This phenomenon is very noticeable where the percentage of rubber is high and is very prominent in the pure rubber sheet. This broken down sheeted rubber is also deficient in elasticity as compared with the rubber which has not been so broken down.

As my aim is to produce a sheet rubber which will not be liable to irregular shrinkage when cut to pattern, which will have superior life as compared with broken down sheeted rubber, which will possess great elasticity, and which will present good wearing qualities combined with an anti-slip surface, I combine a sheet of pure washed and dried rubber, such as the "crape" rubber as previously defined, with a sheet of broken down rubber. Ordinarily the broken down plastic rubber will very efficiently and completely adhere to the "crape" rubber by the simple use of pressure, as, for example, by passing the composite sheet between rolls until they are intimately united. A coating of cementing material may, however, be employed on the contacting surfaces if deemed necessary. This composite sheet will then be found to possess the desired characteristics.

It will be evident that for a given thickness of sheet only a proportion of the material therein has been subjected to the breaking down process and the expense of treating the rubber sheet is thus greatly reduced. The "crape" rubber, owing to its surface, possesses good wearing qualities. The combined sheet possesses substantially all the elasticity of the "crape" rubber and its superior life, and owing to the absence of grain in the "crape" rubber, the irregular shrinkage of the broken down rubber, when cut to pattern, is practically entirely avoided. The sheet of broken down rubber completely closes and protects all the holes which are usually present in the "crape" rubber and contributes the smooth surface which is best adapted for the inner surfaces of articles for which this composite material will be usually employed.

The composite sheet is best vulcanized by the cold or acid cure, and the effectiveness of the cure is greatly enhanced by the ease with which the acid can penetrate the sheet of "crape" rubber, which, owing to its formation, presents far greater surface of rubber for contact with the curing solution than an ordinary sheet.

As an alternative to the acid cure, the composite sheet can be cured by the process hereinbefore referred to by the term "migration of sulfur," that is, the vulcanizing ingredient may be incorporated in the sheet of broken down rubber and after the composite sheets have been formed, when subjected to the vulcanizing heat the vulcanizing ingredient will pentrate the sheet of pure "crape" rubber so that the vulcanizing effect will extend through the "crape" rubber as well as through the sheet of broken down rubber united thereto.

This composite sheet will be found to possess desirable qualities when being formed into various rubber articles, as the sheet of broken down rubber, when cut will readily adhere to other rubber surfaces.

What I claim as my invention is:—

1. A composite sheet of vlucanized rubber comprising a sheet of rubber which is washed and dried but not broken down or compounded in any way, united to and vulcanized in contact with a sheet of rubber washed, dried and broken down without the addition of vulcanizing ingredients.

2. A composite sheet of rubber comprising a sheet of washed and dried pure "crape" rubber united to a sheet of washed, dried and broken down rubber.

3. A composite sheet of rubber comprising a sheet of washed and dried pure "crape" rubber united to a smooth sheet of washed, dried and broken down rubber.

4. A composite sheet of vulcanized rubber comprising a sheet of washed and dried pure "crape" rubber united to a sheet of washed, dried and broken down rubber.

5. A composite sheet of vulcanized rubber comprising a sheet of washed and dried pure "crape" rubber united to a smooth sheet of washed, dried and broken down rubber.

6. A process of forming sheet rubber which consists in applying to a sheet of washed and dried pure "crape" rubber a sheet of washed, dried and broken down rubber, rolling the same together to integrally unite them and finally vulcanizing the composite sheet so formed.

Signed at Toronto, Canada, this 7th day of February, 1918.

WILLIAM SEWARD.